United States Patent
Bergantino

(10) Patent No.: US 11,914,555 B2
(45) Date of Patent: Feb. 27, 2024

(54) DATA PROCESSING FOR NETWORKING SYSTEMS

(71) Applicant: ARRIS Enterprises LLC, Suwanee, GA (US)

(72) Inventor: Matthew Bergantino, Tampa, FL (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/902,759

(22) Filed: Sep. 2, 2022

(65) Prior Publication Data

US 2023/0091223 A1  Mar. 23, 2023

Related U.S. Application Data

(60) Provisional application No. 63/242,917, filed on Sep. 10, 2021.

(51) Int. Cl.
| | | |
|---|---|---|
| G06F 16/178 | (2019.01) | |
| G06F 40/186 | (2020.01) | |
| H04N 21/61 | (2011.01) | |
| H04N 21/647 | (2011.01) | |

(52) U.S. Cl.
CPC ........ *G06F 16/1794* (2019.01); *G06F 40/186* (2020.01); *H04N 21/6118* (2013.01); *H04N 21/647* (2013.01)

(58) Field of Classification Search
CPC .............. H04N 21/6118; H04N 21/647; G06F 16/1794; G06F 40/186; H04L 12/2801
See application file for complete search history.

(56) References Cited

U.S. PATENT DOCUMENTS

| | | | | |
|---|---|---|---|---|
| 8,893,173 | B2* | 11/2014 | Briggs | H04N 21/4725 725/32 |
| 8,898,719 | B2* | 11/2014 | Poder | H04N 21/4112 725/121 |
| 8,910,201 | B1* | 12/2014 | Zamiska | H04N 21/458 725/60 |
| 9,462,340 | B1* | 10/2016 | Mathurin | H04N 21/8106 |
| 9,516,373 | B1* | 12/2016 | Abecassis | H04N 21/4122 |
| 9,596,502 | B1* | 3/2017 | Abecassis | G06F 18/00 |
| 9,973,827 | B2* | 5/2018 | Walker | G06Q 30/0241 |
| 10,403,042 | B2* | 9/2019 | Roveta | G11B 27/322 |
| 2014/0109161 | A1* | 4/2014 | Chang | H04N 21/42204 725/110 |
| 2014/0229980 | A1* | 8/2014 | Bill | H04N 21/43 725/35 |
| 2014/0250477 | A1* | 9/2014 | Kang | H04N 21/42222 725/110 |
| 2014/0278834 | A1* | 9/2014 | Lautz | G06Q 30/0245 705/12 |
| 2016/0077573 | A1* | 3/2016 | Lee | H04L 12/12 713/310 |
| 2017/0177699 | A1* | 6/2017 | Chan | G06F 16/84 |
| 2017/0374417 | A1* | 12/2017 | Hernandez-Mondragon | H04N 21/8106 |
| 2019/0028770 | A1* | 1/2019 | van Kempen | H04N 21/6125 |
| 2019/0090025 | A1* | 3/2019 | Chesson | H04N 21/466 |

(Continued)

*Primary Examiner* — Michael B. Pierorazio
(74) *Attorney, Agent, or Firm* — Chernoff, Vilhauer, McClung & Stenzel, LLP

(57) ABSTRACT

A method of processing diagnostic data including receiving a template file and a diagnostic file. Processing the diagnostic data based upon the template file where array and non-array portions of the data are treated differently.

6 Claims, 7 Drawing Sheets

(56) References Cited

U.S. PATENT DOCUMENTS

| | | |
|---|---|---|
| 2019/0213262 A1* | 7/2019 | Xu .......................... G06F 9/451 |
| 2019/0286462 A1* | 9/2019 | Bodnick ................. G06F 9/453 |
| 2021/0127170 A1* | 4/2021 | Chesson .......... H04N 21/47815 |
| 2022/0137799 A1* | 5/2022 | Chashchin ............ G06F 40/186 |
| | | 715/765 |
| 2022/0147698 A1* | 5/2022 | Revankar .............. G06F 16/958 |
| 2022/0171670 A1* | 6/2022 | Srivatsa ................ G06F 40/186 |
| 2022/0300469 A1* | 9/2022 | Agrawal ............. G06F 16/1794 |
| 2022/0374249 A1* | 11/2022 | Nair ....................... G06Q 10/10 |

* cited by examiner

```
[
  {
    "parameter": "ofdmaData.T4",
    "values": [
      {
        "macAddress": "AAAAAAAAAAAA",
        "ifDescr": "cable-ofdma 0/0/24.0",
        "timeline": {
          "\d{10}": "116500.0"
        }
      }
    ]
  }
]
```

FIG. 5

```
[
  {
    "paramType": "FLOAT",
    "parameter": "ofdmaData.T4",
    "values": [
      {
        "macAddress": "AAAAAAAAAAAA",
        "orginNumPoints": 1054,
        "timeline": {
          "1234567890": "117038.0",
          "1234567891": "116979.0",
          "1234567892": "117006.0",
          "1234567893": "116988.0",
          "1234567894": "116983.0"
        },
        "ifDescr": "cable-ofdma 0/0/32.0",
        "frequency": 56400000
      }
    ]
  },
  {
    "paramType": "FLOAT",
    "parameter": "ofdmaData.T4",
    "values": [
      {
        "macAddress": "AAAAAAAAAAAA",
        "orginNumPoints": 2068,
        "timeline": {
          "1234567890": "117038.0",
          "1234567891": "116979.0",
          "1234567892": "117006.0",
          "1234567893": "116988.0",
          "1234567894": "116983.0"
        },
        "ifDescr": "cable-ofdma 0/0/24.0",
        "frequency": 12300000
      }
    ]
  },
  {
    "paramType": "FLOAT",
    "parameter": "ofdmaData.T4",
    "values": [
      {
        "macAddress": "FFFFFFFFFFFF",
        "orginNumPoints": 1512,
        "timeline": {
          "1234567890": "117038.0",
          "1234567891": "116979.0",
          "1234567892": "117006.0",
          "1234567893": "116988.0",
          "1234567894": "116983.0"
        },
        "ifDescr": "cable-ofdma 0/0/24.0",
        "frequency": 12300000
      }
    ]
  }
]
```

FIG. 6

```
public boolean presenceInStructure (Object o1, Object o2) {
   if (o1 instanceof JSONObject) {
      for (String key : ((JSONObject) o1).keySet()) {
         boolean foundMatch = false;

if ( (((JSONObject) o2).has(key)) ) {
            if (presenceInStructure(((JSONObject) o1).get(key), ((JSONObject) o2).get(key))) {
               foundMatch = true;
            }
         }
         else /* if (a means can be used to allow for regex matching of key names) */ {
         } if (!foundMatch) {
            return false;
         }
      }
   }
   else if (o1 instanceof JSONArray) {
      for (int i=0 ; i<((JSONArray) o1).length() ; i++) {
         boolean foundMatch = false;

for (int j=0 ; j<((JSONArray) o2).lenght() ;j++ {
            if (presenceInStructure(((JSONArray) o1).get(i), ((JSONArray) o2).get(j))) {
               foundMatch = true;
               break;
            }
         } if (!foundMatch) {
            return false;
         }
      }
   }
   else {
      if (o1.toString().equals(o2.toString())) {
         return true;
      }
      else {
         // A means can be used to evaluate how similar the values are
         // and decide if they are within acceptable tolerance
      }
   } return true;
}
```

FIG. 7

DATA PROCESSING FOR NETWORKING SYSTEMS

CROSS REFERENCE TO RELATED APPLICATIONS

This application claims the benefit of U.S. Provisional Patent Application Ser. No. 63/242,917 filed Sep. 10, 2022.

BACKGROUND

The subject matter of this application relates to data processing for data files, and particularly applicable for a cable system.

Cable Television (CATV) services provide content to large groups of customers (e.g., subscribers) from a central delivery unit, generally referred to as a "head end," which distributes channels of content to its customers from this central delivery unit through an access network comprising a hybrid fiber coax (HFC) cable plant, including associated components (nodes, amplifiers and taps). Modern Cable Television (CATV) service networks, however, not only provide media content such as television channels and music channels to a customer, but also provide a host of digital communication services such as Internet Service, Video-on-Demand, telephone service such as VoIP, home automation/security, and so forth. These digital communication services, in turn, require not only communication in a downstream direction from the head end, through the HFC, typically forming a branch network and to a customer, but also require communication in an upstream direction from a customer to the head end typically through the HFC network.

To this end, CATV head ends have historically included a separate Cable Modem Termination System (CMTS), used to provide high speed data services, such as cable Internet, Voice over Internet Protocol, etc. to cable customers and a video headend system, used to provide video services, such as broadcast video and video on demand (VOD). Typically, a CMTS will include both Ethernet interfaces (or other more traditional high-speed data interfaces) as well as radio frequency (RF) interfaces so that traffic coming from the Internet can be routed (or bridged) through the Ethernet interface, through the CMTS, and then onto the RF interfaces that are connected to the cable company's hybrid fiber coax (HFC) system. Downstream traffic is delivered from the CMTS to a cable modem and/or set top box in a customer's home, while upstream traffic is delivered from a cable modem and/or set top box in a customer's home to the CMTS. The Video Headend System similarly provides video to either a set-top, TV with a video decryption card, or other device capable of demodulating and decrypting the incoming encrypted video services. Many modern CATV systems have combined the functionality of the CMTS with the video delivery system (e.g., EdgeQAM—quadrature amplitude modulation) in a single platform generally referred to an Integrated CMTS (e.g., Integrated Converged Cable Access Platform (CCAP))—video services are prepared and provided to the I-CCAP which then QAM modulates the video onto the appropriate frequencies. Still other modern CATV systems generally referred to as distributed CMTS (e.g., distributed Converged Cable Access Platform) may include a Remote PHY (or R-PHY) which relocates the physical layer (PHY) of a traditional Integrated CCAP by pushing it to the network's fiber nodes (R-MAC PHY relocates both the MAC and the PHY to the network's nodes). Thus, while the core in the CCAP performs the higher layer processing, the R-PHY device in the remote node converts the downstream data sent from the core from digital-to-analog to be transmitted on radio frequency to the cable modems and/or set top boxes, and converts the upstream radio frequency data sent from the cable modems and/or set top boxes from analog-to-digital format to be transmitted optically to the core.

BRIEF DESCRIPTION OF THE DRAWINGS

For a better understanding of the invention, and to show how the same may be carried into effect, reference will now be made, by way of example, to the accompanying drawings, in which:

FIG. 5 illustrates a JSON template.

FIG. 6 illustrates an exemplary result of processing of a JSON diagnostic file with the JSON template.

FIG. 7 illustrates a simplified JSON processing schema for the diagnostic system.

DETAILED DESCRIPTION

Figure 1:
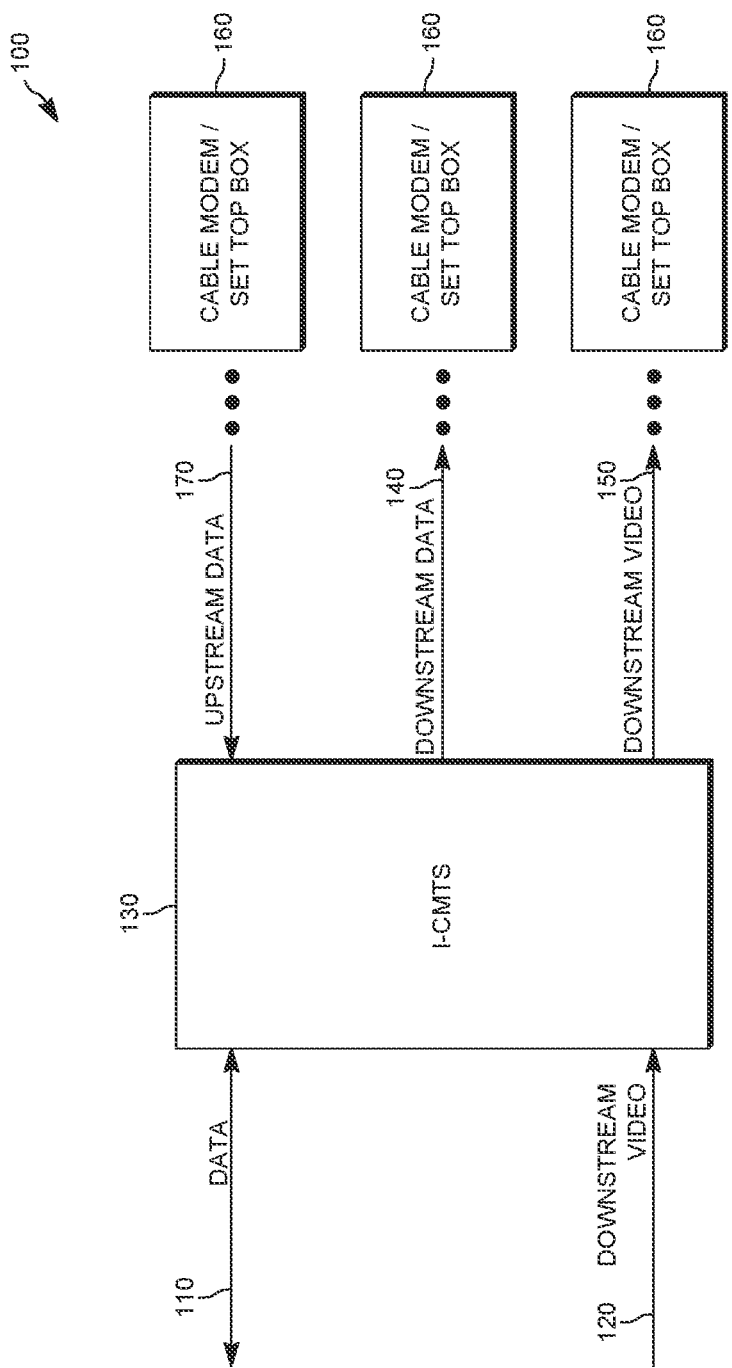
FIG. 1 illustrates an integrated Cable Modem Termination System.

Referring to FIG. 1, an integrated CMTS (e.g., Integrated Converged Cable Access Platform (CCAP)) 100 may include data 110 that is sent and received over the Internet (or other network) typically in the form of packetized data. The integrated CMTS 100 may also receive downstream video 120, typically in the form of packetized data from an operator video aggregation system. By way of example, broadcast video is typically obtained from a satellite delivery system and pre-processed for delivery to the subscriber though the CCAP or video headend system. The integrated CMTS 100 receives and processes the received data 110 and downstream video 120. The CMTS 130 may transmit downstream data 140 and downstream video 150 to a customer's cable modem and/or set top box 160 through a RF distribution network, which may include other devices, such as amplifiers and splitters. The CMTS 130 may receive upstream data 170 from a customer's cable modem and/or set top box 160 through a network, which may include other devices, such as amplifiers and splitters. The CMTS 130 may include multiple devices to achieve its desired capabilities.

Figure 2:
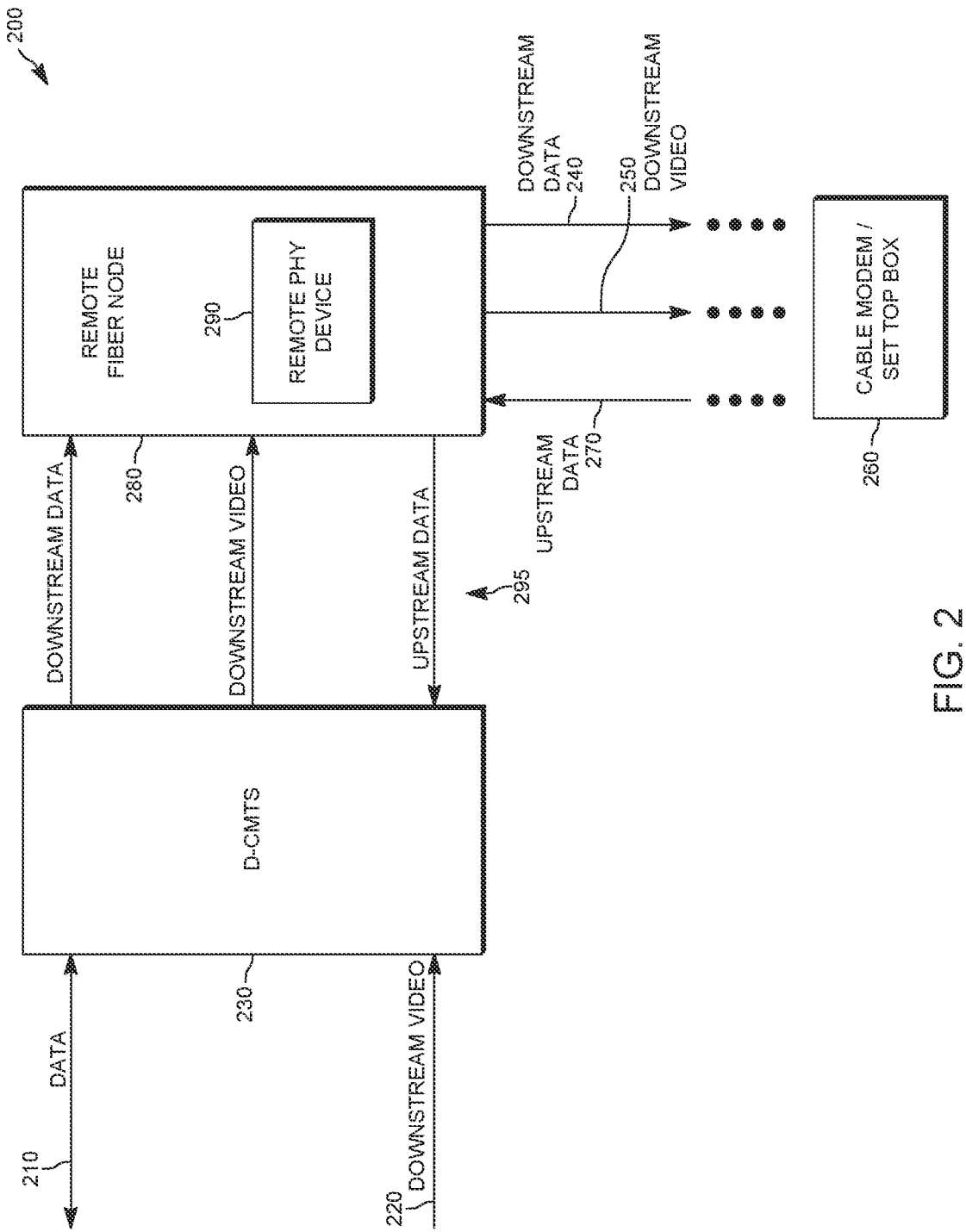
FIG. 2 illustrates a distributed Cable Modem Termination System.

Referring to FIG. 2, as a result of increasing bandwidth demands, limited facility space for integrated CMTSs, and power consumption considerations, it is desirable to include a Distributed Cable Modem Termination System (D-CMTS) 200 (e.g., Distributed Converged Cable Access Platform (CCAP)). In general, the CMTS is focused on data services while the CCAP further includes broadcast video services. The D-CMTS 200 distributes a portion of the functionality of the I-CMTS 100 downstream to a remote location, such as a fiber node, using network packetized data. An exemplary D-CMTS 200 may include a remote PHY architecture, where a remote PHY (R-PHY) is preferably an optical node device that is located at the junction of the fiber and the coaxial. In general the R-PHY often includes the MAC and/or PHY layers of a portion of the system. The D-CMTS 200 may include a D-CMTS 230 (e.g., core) that includes data 210 that is sent and received over the Internet (or other network) typically in the form of packetized data. The D-CMTS 230 may also receive downstream video 220, typically in the form of packetized data from an operator video aggregation system. The D-CMTS 230 receives and processes the received data 210 and downstream video 220. A remote fiber node 280 preferably include a remote PHY device 290. The remote PHY device 290 may transmit downstream data 240 and downstream video 250 to a customer's cable modem and/or set top box 260 through a network, which may include other devices, such as amplifier and splitters. The remote PHY device 290 may receive upstream data 270 from a customer's cable modem and/or set top box 260 through a network, which may include other devices, such as amplifiers and splitters. The remote PHY device 290 may include multiple devices to achieve its desired capabilities. The remote PHY device 290 primarily includes PHY related circuitry, such as downstream QAM modulators, upstream QAM demodulators, together with pseudowire logic to connect to the D-CMTS 230 using network packetized data. The remote PHY device 290 and the D-CMTS 230 may include data and/or video interconnections, such as downstream data, downstream video, and upstream data 295. It is noted that, in some embodiments, video traffic may go directly to the remote physical device thereby bypassing the D-CMTS 230.

By way of example, the remote PHY device 290 may covert downstream DOCSIS (i.e., Data Over Cable Service Interface Specification) data (e.g., DOCSIS 1.0; 1.1; 2.0; 3.0; 3.1; and 4.0 each of which are incorporated herein by reference in their entirety), video data, out of band signals received from the D-CMTS 230 to analog for transmission over RF or analog optics. By way of example, the remote PHY device 290 may convert upstream DOCSIS, and out of band signals received from an analog medium, such as RF or analog optics, to digital for transmission to the D-CMTS 230. As it may be observed, depending on the particular configuration, the R-PHY may move all or a portion of the DOCSIS MAC and/or PHY layers down to the fiber node.

Figure 3:
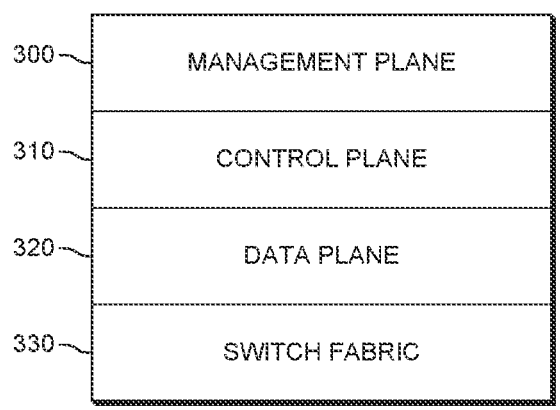
FIG. 3 illustrates a layered network processing stack.

Referring to FIG. 3, for data processing and for transferring data across a network, the architecture of the hardware and/or software may be configured in the form of a plurality of different planes, each of which performing a different set of functionality. In relevant part the layered architecture may include different planes such as a management plane 300, a control plane 310, a data plane 320, and switch fabric 330 to effectuate sending and receiving packets of data.

For example, the management plane 300 may be generally considered as the customer interaction or otherwise the general software application being run. The management plane typically configures, monitors, and provides management, monitoring, and configuration served to all layers of the network stack and other portions of the system.

For example, the control plane 310 is a component to a switching function that often includes system configuration, management, and exchange of routing table information and forwarding information. Typically, the exchange of routing table information is performed relatively infrequently. A route controller of the control plane 310 exchanges topology information with other switches and constructs a routing table based upon a routing protocol. The control plane may also create a forwarding table for a forwarding engine. In general, the control plane may be thought of as the layer that makes decisions about where traffic is sent. Since the control functions are not performed on each arriving individual packet, they tend not to have a strict speed constraint.

For example, the data plane 320 parses packet headers for switching, manages quality of service, filtering, medium access control, encapsulations, and/or queuing. As a general matter, the data plane carriers the data traffic, which may be substantial in the case of cable distribution networks. In general, the data plane may be thought of as the layer that primarily forwards traffic to the next hop along the path to the selected destination according to the control plane logic through the switch fabric. The data plane tends to have strict speed constraints since it is performing functions on each arriving individual packet.

For example, the switch fabric 330 provides a network topology to interconnect network nodes via one or more network switches.

The remote physical device 290 needs to support resetting itself in order to updates to software and hardware configurations. For example, the D-CMTS 230 may command the remote physical device 290 to reset via a ResetCtrl GCP TLV, such as using a command line interface. For example, the remote physical device 290 may initiate a reset on its own in reaction to some internal or external event.

Whether the network includes an integrated Cable Modem Termination System and/or a distributed Cable Modem Termination System, it is desirable to obtain diagnostic data from the cable modem termination system and/or one or more of the cable modems. The diagnostic data includes a multitude of different types of data, such as for example, mac addresses, cable modem identification, number of ports, frequency of data received/transmitted, characteristics of the data being transmitted, etc. As a result of the cable modem termination system processing high volumes of data, together with potentially thousands to tens of thousands of cable modems, there is a substantial amount of diagnostic data that can result over a relatively short period of time. In order to characterize the operation of the system based upon the resulting diagnostic data, a data processing tool may be used to parse the diagnostic data. The data processing tool needs to identify various characteristics of the diagnostic data, such as whether particular numerical values and/or textual sequences are within acceptable ranges or equal to a specific value/sequence, or otherwise particular sets of numerical values or textual sequences are within acceptable ranges or equal to a specific value/sequence. In addition to the determination of one or more numerical values and/or textual sequences, the relationships between such numerical values and/or textual sequences should likewise be determined. With such a substantial amount of diagnostics data to be processed, with the correlations between such data being of value, the existing tools tend to be confused and therefore tend to identify substantial amounts of non-useful data at a highly granular level or otherwise fail to identify useful correlations of data at a less granular level.

Upon further analysis it was determined that a substantial amount of the diagnostic data from a cable modem termination system and/or cable modems tends to be provided in a JSON (JavaScript Object Notation) format. JSON is an open standard file format and data interchange format that uses human-readable text to store and transmit data objects consisting of attribute-value pairs and arrays (or other serializable values). JSON is a language-independent data format. See, ISO/IEC 21778:2017, incorporated by reference herein. JSON includes a number of data types, such as for example, number (signed decimal number), string (a sequency of zero or more Unicode characters), Boolean (true or false), array (an ordered list of zero or more elements, each of which may be of any type, where arrays use square bracket notation with comma-separated elements), object (a collection of name-value pairs where the names (also called keys) are strings, objects are intended to represent associate arrays, where each key is unique within an object, objects are delimited with curly brackets and use comma to separate each pair, while within each pair the colon character separates the key or name from its value), null (an empty value using the word null), etc. As such, JSON includes a lot of flexibility in how the diagnostic data is arranged by the CMTS and/or cable modem. After further analysis, it was determined that the CMTS and/or the cable modem does not necessarily provide the data in the same manner or organization within the JSON data format each time it is provided. By way of example, often it is desirable to identify diagnostic data associated with a particular cable modem, and further diagnostic data associated with a particular channel of the particular cable modem, and further particular diagnostic data associated with the particular channel of the particular cable modem, which may in turn be associated with diagnostic data of one or more other cable modems and/or CMTS. To identify the nature of this diagnostic data in a meaningful manner it was determined that a template based approach is desirable.

Figure 4:
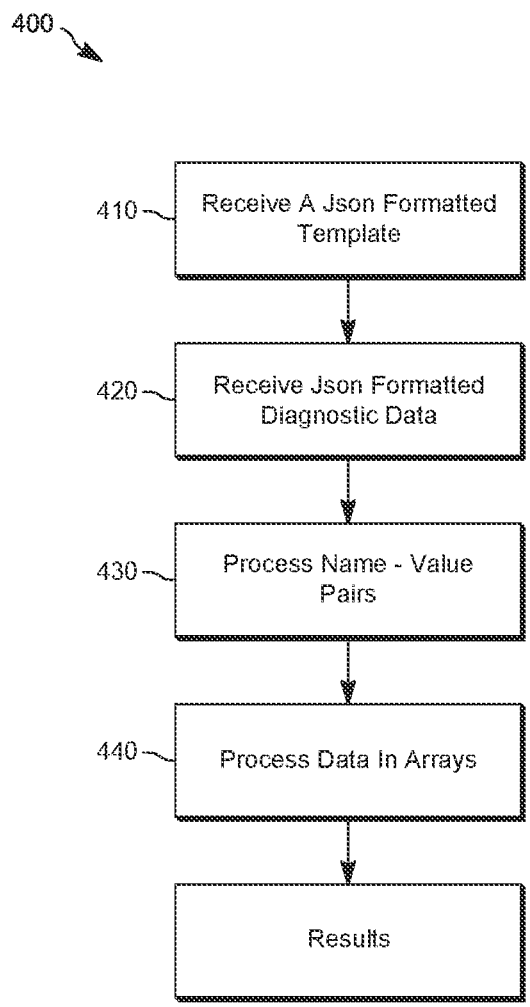
FIG. 4 illustrates a diagnostic system.

Referring to FIG. 4, the diagnostic system 400 may receive a JSON template 410 that is used to characterize the diagnostic data. The JSON template 400 includes syntax that is in JSON format which is the same format as the JSON diagnostic data. The JSON template 400 is created to include the diagnostically relevant portions of the corresponding JSON diagnostic data arranged in a manner similar to that which is expected within the diagnostic data. The JSON template 400 preferably does not include JSON portions that are not relevant or very relevant to the types of characteristics that are desired to identify.

Referring to FIG. 5, an exemplary JSON template is illustrated. An object has a name-value pair of "parameter" and "ofdmaData.T4". The object has a name-value pair of "values" and an array "[ . . . ]". Within the array an object has name-value pair of "macAddress" and "AAAAAAAAAAAAA". Within the array the object has name-value pair of "ifDescr" and of "cable-ofdma 0/0/24.0". Within the array the object has name-value pair of "timeline" and another object that has a name-value pair of "\d{10}" and "116500.0". As it may be observed, JSON includes a hierarchical data structure of objects and arrays that may contain multiple piece of data.

The diagnostic system 400 may receive a JSON formatted set of diagnostic data 420 from the CMTS and/or cable modems. It was determined that the more relevant parts of the diagnostic data 420 tends to have the name-value pairs in the same relative order and/or hierarchy as the JSON template 410. The diagnostic system 400 may process each name-value pair 430, such as starting with the first name-value pair to determine any corresponding matches of the name-value pair in the diagnostic data 420, and proceeding to the subsequent name-value pairs in a serial fashion. The matching for each name-value pair may be determined based upon any suitable characteristic, including for example, greater than, less than, equal to, greater than or equal to, less than or equal to, number of matching letters, sequence length of matching letters, etc. In this manner, the system may perform a matching of name-value pairs in the diagnostic data to identify corresponding matches. In this manner, the system may further perform a matching that the order of the name-value pairs in the diagnostic data is determined to match that of the JSON formatted template 410. The matching order may include additional JSON syntax between the name-value pairs, which is ignored. In this manner the system may identify those portions of the diagnostic data 420 that includes the corresponding name-value pairs in the matching order and/or hierarchy levels.

After analysis of the diagnostic data, it was determined that the location of data within an array tends to vary from device to device, and from request to request, even for the same data request from the same device. Based upon this determination, it was determined that when identifying corresponding matches from within an array, the location or relative location with the array, should not be a criteria for matching. Rather, the characteristics being used for matching is whether the corresponding data is included within the array at any location, or whether the corresponding data is not included within the array at any location. Accordingly, for name-value pairs within an array or other matching characteristics within an array, the determination should be made as to whether a corresponding match is present at any location within the array 440. If a corresponding match at any location within the array is determined, the system should consider such data a match.

After the matching is performed, the system should output the results identifying the matching portions from the diagnostic data is some manner, such as highlighting.

Referring to FIG. 6, an exemplary matching for the template is illustrated.

While JSON is the preferred format, other formats may likewise be used, as desired.

While using diagnostic data from CMTS and/or cable modems is desirable, other data sources may likewise be used.

FIG. 7 illustrates software code for a simplified exemplary diagnostic system.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A method for processing diagnostic data from a cable distribution system that includes a head end connected to a plurality of customer devices through a transmission network that includes a remote fiber node that converts digital data to analog data suitable for said plurality of customer devices, comprising the steps of:
    (a) receiving a JSON formatted template data file;
    (b) receiving a JSON formatted diagnostic data file from said cable distribution system;
    (c) non-array processing said JSON formatted diagnostic data file based upon said JSON formatted template data file to correlate name-value pairs outside of an array from said JSON formatted template data file with said JSON formatted diagnostic data file while based upon an order of said name-value pairs in said JSON formatted template file and a corresponding order of said name-value pairs in said JSON formatted diagnostic data file;
    (d) array processing said JSON formatted diagnostic data file based upon said JSON formatted template data file to correlate name-value pairs within an array from said JSON formatted template data file with said JSON formatted diagnostic data file while without regard to an order of said name-value pairs in said JSON formatted template file and without regard to a corresponding order of said name-value pairs within said array in said JSON formatted diagnostic data file;
    (e) providing said JSON formatted diagnostic data file based upon said non-array processing and said array second processing.

2. The method of claim 1 wherein said non-array processing of said JSON formatted diagnostic data file is based upon identifying corresponding pairs of said name-value pairs in a same order within said JSON formatted diagnostic data file and said JSON formatted template data file.

3. The method of claim 1 wherein said non-array processing of said JSON formatted diagnostic data file is based upon identifying corresponding pairs of said name-value pairs in a same order within said JSON formatted diagnostic data file and said JSON formatted template data file with matching hierarchy.

4. A method for processing diagnostic data comprising the steps of:
    (a) receiving a JSON formatted template data file;
    (b) receiving a JSON formatted diagnostic data file;
    (c) non-array processing said JSON formatted diagnostic data file based upon said JSON formatted template data file to correlate name-value pairs outside of an array from said JSON formatted template data file with said JSON formatted diagnostic data file while based upon an order of said name-value pairs in said JSON formatted template file and a corresponding order of said name-value pairs in said JSON formatted diagnostic data file;
    (d) array processing said JSON formatted diagnostic data file based upon said JSON formatted template data file to correlate name-value pairs within an array from said JSON formatted template data file with said JSON formatted diagnostic data file while without regard to an order of said name-value pairs in said JSON formatted template file and without regard to a corresponding order of said name-value pairs within said array in said JSON formatted diagnostic data file;
    (e) providing said JSON formatted diagnostic data file based upon said non-array processing and said array second processing.

5. The method of claim 4 wherein said non-array processing of said JSON formatted diagnostic data file is based upon identifying corresponding pairs of said name-value pairs in a same order within said JSON formatted diagnostic data file and said JSON formatted template data file.

6. The method of claim 4 wherein said non-array processing of said JSON formatted diagnostic data file is based upon identifying corresponding pairs of said name-value pairs in a same order within said JSON formatted diagnostic data file and said JSON formatted template data file with matching hierarchy.

\* \* \* \* \*